United States Patent [19]

Abolins et al.

[11] Patent Number: 5,011,736
[45] Date of Patent: Apr. 30, 1991

[54] CROSSLINKABLE FLAME RETARDANT COMPOSITION OF POLYPHENYLENE ETHER AND ELASTOMERS

[75] Inventors: Visvaldis Abolins, Delmar, N.Y.; Joseph E. Betts, Westport, Conn.; Fred F. Holub, Schenectady; Gim F. Lee, Jr., Albany, both of N.Y.

[73] Assignee: General Electric Co., Selkirk, N.Y.

[21] Appl. No.: 458,854

[22] Filed: Dec. 29, 1989

Related U.S. Application Data

[60] Division of Ser. No. 847,201, Apr. 2, 1986, Pat. No. 4,900,768, which is a continuation of Ser. No. 525,785, Aug. 23, 1983, abandoned.

[51] Int. Cl.$^5$ ............... C08K 5/523; C08K 5/51; B32B 5/16
[52] U.S. Cl. .................. 428/407; 428/461; 428/462; 524/141; 524/142; 524/153; 524/374; 524/409; 524/508
[58] Field of Search .......... 260/DIG. 24; 524/141, 524/142, 153, 374, 409, 508; 525/92, 132, 152, 192, 332.5, 387; 428/375, 407, 461, 462

[56] References Cited

U.S. PATENT DOCUMENTS

| | | | |
|---|---|---|---|
| 3,257,358 | 6/1966 | Stamatoff | 528/215 |
| 3,306,874 | 2/1967 | Hay | 528/215 |
| 3,306,875 | 2/1967 | Hay | 528/215 |
| 3,383,435 | 5/1968 | Cizek | 525/132 |
| 3,639,506 | 2/1972 | Haaf | 524/141 |
| 4,016,138 | 4/1977 | Anderson | 524/373 |
| 4,134,927 | 1/1979 | Tomoshige et al. | 525/245 |
| 4,196,116 | 4/1980 | Haaf et al. | 525/68 |
| 4,203,931 | 5/1980 | Lee, Jr. | 524/411 |
| 4,322,507 | 3/1982 | Haaf | 525/92 |
| 4,355,126 | 10/1982 | Haaf et al. | 524/411 |
| 4,693,937 | 9/1987 | Wu et al. | 428/375 |
| 4,743,505 | 5/1988 | Yamada et al. | 428/375 |

FOREIGN PATENT DOCUMENTS 2043083 10/1980 United Kingdom .

Primary Examiner—Kriellion Morgan
Attorney, Agent, or Firm—Susan F. Gullotti; Francis T. Coppa

[57] ABSTRACT

Flame retardant mixtures of a polyphenylene ether resin, an alkenyl aromatic elastomer, an organic phosphate flame retardant agent and a crosslinking agent are described. They are curable by heating or by exposure to high energy radiation. Articles such as electrical wires and cables comprising insulation made of the composition, and a method of their production, are also disclosed.

33 Claims, 1 Drawing Sheet

CROSSLINKABLE FLAME RETARDANT COMPOSITION OF POLYPHENYLENE ETHER AND ELASTOMERS

This is a divisional of application Ser. No. 847,201, filed Apr. 2, 1986, now U.S. Pat. No. 4,900,768, which is a continuation of Ser. No. 525,785, filed on Aug. 23, 1983.

BACKGROUND OF THE INVENTION

The polyphenylene ether resins are a family of engineering thermoplastics known to be useful with other polymers such as alkenyl aromatic resins to form compositions which are extrudable and moldable into various articles of commerce. The polyphenylene ether resins are described in the patent literature, for example, in U.S. Pat. Nos. 3,306,874 and 3,306,875 (Hay), and U.S. Pat. Nos. 3,257,357 and 3,257,358 (Stamatoff). Blends of polyphenylene ether resin and styrene polymers are disclosed by Cizek in U.S. Pat. No. 3,383,435.

It is also known that polyphenylene ether resin blends can be made more flame retardant by the addition of agents effective for that purpose. Flame retardant polyphenylene ether—polystyrene compositions are described, for instance, in Lee, Jr., U.S. Pat. No. 4,203,931, in which a halogenated aromatic, for example, tetrabromobenzene, is proposed as a suitable agent; and in Haaf, et al., U.S. Pat. No. 4,355,126, in which aromatic phosphates and halogenated aromatics are listed. All of these compositions are thermoplastic by nature, being softened upon heating followed by hardening when cooled.

SUMMARY OF THE INVENTION

The discovery has now been made of a crosslinkable, flame retardant composition of a polyphenylene ether resin, an alkenyl aromatic elastomer, an organic phosphate and a crosslinking agent, optionally also containing a flame retardant brominated compound or polymer. The composition can be crosslinked (i.e., cured) by exposure to elevated temperatures, for example, about 300° F. or higher, or to high energy radiation, for example, high energy electrons. The cured material is characterized by decisively better tensile elongation and strength than the corresponding composition without the crosslinking agent.

The invention also comprises, in its other aspects, electrically conductive articles, such as wires and cables, containing insulation prepared from the above-described composition, as well as processes for producing such articles.

DESCRIPTION OF THE INVENTION

The composition of this invention comprises, in its broadest features, an admixture of (a) a polyphenylene ether resin, (b) an alkenyl aromatic elastomer, (c) an effective amount of an organic phosphate flame retardant agent, and (d) an effective amount of a crosslinking agent.

Preferred for use as the polyphenylene ether resin, component (a)(i), are homopolymers and copolymers having units of the formula

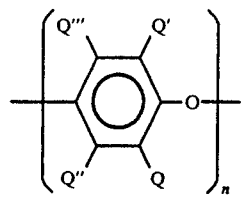

wherein Q, Q', Q" and Q''', are independently selected from the group consisting of hydrogen, halogen, hydrocarbon radicals, halohydrocarbon radicals, hydrocarbonoxy radicals, and halohydrocarbonoxy radicals; and n represents the total number of monomer units and is an integer at least about 20, and preferably at least 50.

In general, the polyphenylene ether resins are self-condensation products of monohydric monocyclic phenols produced by reacting the phenols with oxygen in the presence of complex metal catalysts, with molecular weight being controlled by reaction time, longer times providing a higher average number of repeating units. Particular procedures are known to those skilled in the art and are described in the patent literature, including U.S. Pat. Nos. 3,306,874 and 3,306,875 (to Allan Hay), and U.S. Patent Nos. 3,257,357 and 3,257,358 (to Gelu Stamatoff).

Illustrative polymers which can be produced by such procedures and which are within the above general formula are: poly(2,6-dilauryl-1,4-phenylene) ether; poly(2,6-diphenyl-1,4-phenylene)ether; poly (2,6-dimethoxy-1,4-phenylene)ether; poly(2,6-diethoxy-1,4-phenylene)ether; poly(2-methoxy-6-ethoxy-1,4-phenylene)ether; poly(2-ethyl-6-stearyloxy-1,4-phenylene)ether; poly(2,6-dichloro-1,4-phenylene)ether; poly(2-methyl-6-phenyl-1,4-phenylene)ether; poly(2,6-dibenzyl-1,4-phenylene)ether; poly(2-ethoxy-1,4-phenylene)ether; poly(2-chloro-1,4-phenylene)ether; poly(2,6-dibromo-1,4-phenylene)ether; and the like.

Also included are polyphenylene ether copolymers such as copolymers of 2,6-dimethylphenol with other phenols, for example, with 2,3,6-trimethylphenol or 2-methyl-6-butylphenol, etc.

For purposes of the present invention, an especially preferred family of polyphenylene ethers include those having an alkyl substitution in the two positions ortho to the oxygen ether atom, i.e., those of the above formula wherein Q and Q' are alkyl, most preferably having from 1 to 4 carbon atoms. Illustrative members of this class are: poly(2,6-dimethyl-1,4-phenylene)ether; poly(2,6-diethyl-1,4-phenylene)ether; poly(2-methyl-6-ethyl-1,4-phenylene)ether; poly(2-menthyl-6-propyl-1,4-phenylene) ether; poly(2,6-dipropyl-1,4-phenylene)ether; poly(2-ethyl-6-propyl-1,4-phenylene)ether; and the like.

The most preferred polyphenylene ether resin for purposes of the present invention is poly (2,6-dimethyl-1,4-phenylene)ether.

The alkenyl aromatic elastomer, component (b) of the composition, is preferably a co- or terpolymer having at least some units derived from an alkenyl aromatic monomer of the formula

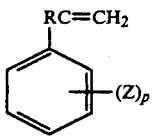

where R is hydrogen, alkyl of from 1 to 4 carbon atoms or halogen; Z is vinyl, hydrogen, halogen, or alkyl of from to 4 carbon atoms; and p is an integer from 1 to 5.

Falling within the above formula are styrene and its homologs and analogs, including alpha-methyl styrene, para-methyl styrene, bromostyrene, chlorostyrene, xylene, vinyl toluene, vinyl xylene, ethyl vinyl xylene, vinyl naphthalene, and the like, individually or in various admixtures of two or more.

Illustratively, component (b) can be an elastomeric copolymer or terpolymer of an alkenyl aromatic compound and an elastomeric precursor such as a diene, for example, styrene-butadiene copolymers or styrene-isoprene copolymers, styrene-butadiene-styrene or styrene-isoprene-styrene terpolymers, including hydrogenated derivatives such as styrene-ethylene/butylene copolymers and styrene-ethylene/butylenestyrene terpolymers, to name the most preferred materials. Mixtures of two or more of any of the foregoing are permissible. Still others will also occur to those skilled in the art, from among the many alkenyl aromatic elastomers which are available or have been described in the literature.

The organic phosphate, component (c) of the composition, is preferably an aromatic phosphate compound of the formula

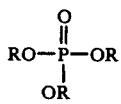

where R is the same or different and is alkyl, cycloalkyl, aryl, alkyl substituted aryl, halogen substituted aryl, aryl substituted alkyl, halogen, or a combination of any of the foregoing, provided at least one R is aryl.

Examples include phenyl bisdodecyl phosphate, phenylbisneopentyl phosphate, phenyl-bis (3,5,5'-trimethylhexyl phosphate), ethyldiphenyl phosphate, 2-ethylhexyldi(p-tolyl) phosphate, bis-(2-ethylhexyl) p-tolylphosphate, tritolyl phosphate, bis-(2-ethylhexyl) phenyl phosphate, tri-(nonylphenyl) phosphate, di(dodecyl)p-tolyl phosphate, tricresyl phosphate, triphenyl phosphate, dibutylphenyl phosphate, 2-chloroethyldiphenyl phosphate, p-tolyl bis (2,5,5'-trimethylhexyl)phosphate, 2-ethylhexyldiphenyl phosphate, and the like. The preferred phosphates are those in which each R is aryl. Especially preferred is triphenyl phosphate, which may be either unsubstituted or substituted, for example, isopropylated triphenyl phosphate.

Alternatively, the organic phosphate can be a di- or polyfunctional compound or polymer having the formula

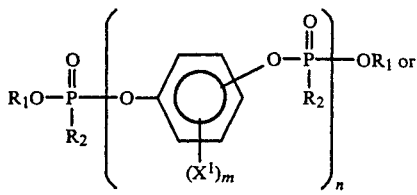

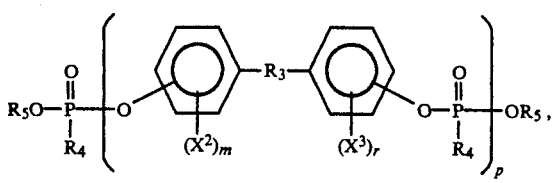

or

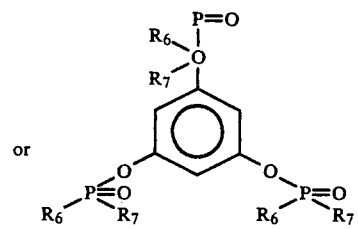

including mixtures thereof, in which $R_1$, $R_3$ and $R_5$ are, independently, hydrocarbon; $R_2$, $R_4$, $R_6$ and $R_7$ are, independently, hydrocarbon or hydrocarbonoxy; $X^1$, $X^2$ and $X^3$ are halogen; m and r are 0 or integers from 1 to 4, and n and p are integers from 1 to 30.

Examples include the bis diphenyl phosphates of resorcinol, hydroquinone and bisphenol-A, respectively, or their polymeric counterparts.

Methods for the preparation of the aforementioned di- and polyfunctional aromatic phosphates are described in British Patent No. 2,043,083.

The polyphenylene ether, component (a), and the elastomer, component (b), are admixable in widely variant amounts, for example, in a weight ratio of from 20:1 to 1:20.

The organic phosphate is added in amounts effective to improve the flame retardancy of (a) and (b). Illustratively, concentrations of from 1 to about 30 parts by weight for each 100 parts of (a) and (b), combined, are useful.

The composition is also modified to be thermosetting, that is, heat curable, or radiation curable by including one or more compounds, as component (d), effective to cause crosslinking when the composition is exposed to an elevated temperature, for example, about 300° F. or higher, or to high energy radiation, for a relatively brief period of time. Preferably, the crosslinking agent has a low volatility at the temperatures employed for processing, as well as good stability in the presence of the other ingredients of the composition. Special mention is made of organic peroxides, for example, dicumyl peroxide; 2,5-dimethyl-2,5-di(tert-butylperoxy) hexane; 2,2'-bis(t-butylperoxy)-diisopropyl benzene; ethyl 3,3-bis(t-butylperoxy)butyrate; n-butyl-4,4-bis (4-butylperoxy)-valerate; and 2,5-dimethyl-2,5-di (t-butylperoxy)hexane-3. Amounts of from about 1.5 to about 10 parts by weight of the crosslinking agent, for each 100 parts of (a) and (b) combined, are generally sufficient to provide the desired crosslinking.

The composition optionally can also include (e) a stable brominated flame retardant material, which can be an additional component of the composition if desired. This ingredient can be a brominated compound, or oligomer, or polymer that is reasonably stable at elevated temperatures, particularly those temperatures above 100° C., and, moreover, is relatively nonvolatile at about 100° C.

In the most preferred cases, this optional ingredient is a bis phenoxy alkane of the formula

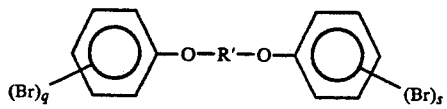

where R' is alkylene, straight or branched, having from 1 to 10 carbon atoms, and, more preferably, from 1 to about 6 carbon atoms; and q and s represent the total number of bromine atoms on each ring and are, independently, integers from 1 to 5.

Examples are 1,2-bis(2,4,6-tribromophenoxy) ethane; 1,3-bis(2,4,6-tribromophenoxy)propane; 1,4-bis (2,4,6-tribromophenoxy)butane; and 2,2-bis(4-bromophenoxy)propane. Preferred are 1,2-bis(2,3,4,5,6-pentabromophenoxy)ethane. A method of preparation is described in U.S. Pat. No. 4,016,138 (Anderson).

Also useful are brominated oligomeric or polymeric flame retardants, including those which are described in U.S. Pat. No. 3,334,154 (Kim) and U.S. Pat. No. 3,833,685 (Wambach). For example, these can be aromatic carbonate copolymers having units of the formula

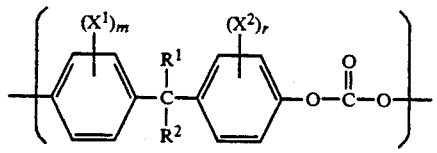

in which $R^1$ and $R^2$ are hydrogen, (lower) alkyl or phenyl, $X^1$ and $X^2$ are bromo or chloro, and m and r are integers from 1 to 4, and units of the formula

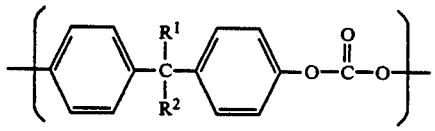

in which $R^1$ and $R^2$ are as defined above.

Especially preferred, however, are oligomeric tetrabromobisphenol-A polycarbonates.

Amounts of from 0 to about 30 parts by weight for each 100 parts of (a) and (b) together are preferred.

The brominated additive can be used alone, or together with a synergistic agent such as an antimony or molybdenum compound. The synergist can be selected from among those compounds based on the aforementioned elements which are known to improve the effectiveness of brominated flame retardants. Among these, antimony oxide is especially preferred for use in this invention, usually in amounts from about 1 to about 10 parts by weight per 100 parts of (a) and (b).

The composition may be prepared in any convenient manner, such as by forming a mixture of components (a), (b), (c) and (d), and any other ingredients, extruding the mixture at an elevated temperature, and then processing into the shaped article, as by molding.

A particular application involves the use of the composition in the manufacture of insulation material for electrically conductive articles, for example, copper or aluminum wires and cables. A method of use comprises providing the described composition and applying it to the surface of an electrically conductive metal article; thermosetting or radiation curing can take place before application, or in situ on the metal article. The insulated article can additionally comprise an outer protective coating, which can be made of a thermoplastic or thermosetting polymer, e.g., polyvinyl chloride. Exemplary products are shown in the accompanying drawings, which are described below.

DESCRIPTION OF THE SPECIFIC EMBODIMENTS

Figure 1:
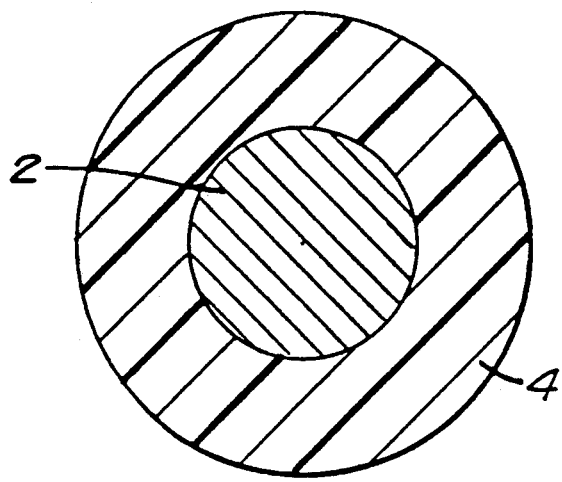
FIG. 1 illustrates an electrically conductive article in accordance with the invention, in cross-section, comprising copper wire 2, and insulation layer 4, consisting of a flame retardant composition as described above.
Figure 2:
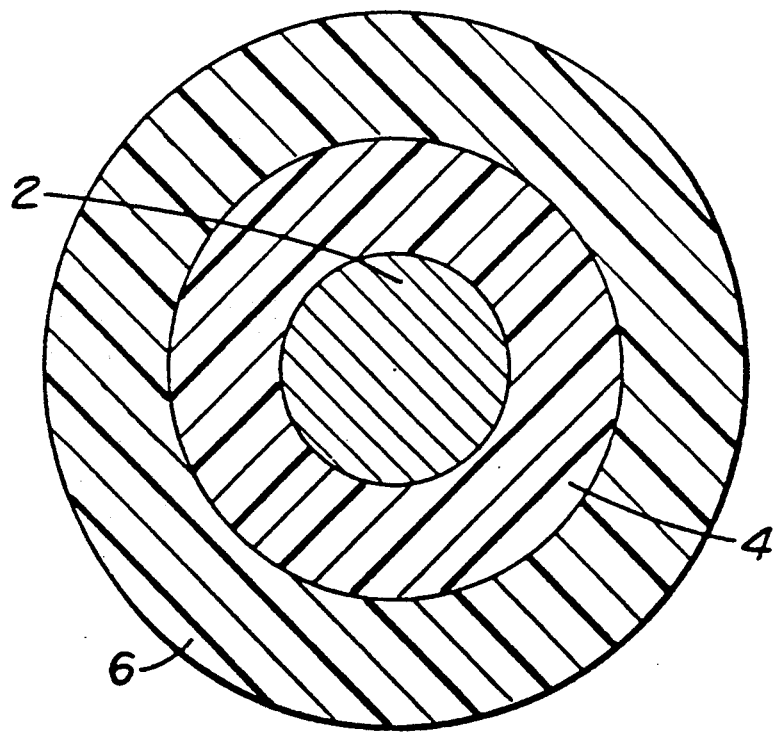
FIG. 2 illustrates a modified embodiment, also in cross-section, comprising copper wire 2, flame retardant insulation layer 4, and outer protective polymeric coating 6.

The invention is illustrated in the following examples, which are intended to show merely some of the embodiments possible. All amounts are stated in parts by weight.

EXAMPLES 1-4

Thermosetting compositions in accordance with the invention were prepared using the ingredients noted in 2 and 4 below. The blends were compression molded at 360° F. for 10 minutes to effect curing. For comparison purposes, thermoplastic blends 1 and 3 were compression molded at 360° F., for 45 minutes.

TABLE 1

| | 1 | 2 | 3 | 4 |
|---|---|---|---|---|
| INGREDIENTS, parts by weight | | | | |
| Styrene-butadiene rubber | 30 | 30 | 40 | 40 |
| Poly(2-6-dimethyl-1,4-phenylene) ether resin | 45 | 45 | 30 | 30 |
| Elastomeric styrene-ethylene/butylene-styrene block copolymer (SEBS) | 30 | 30 | 20 | 20 |
| Isopropylated triphenyl phosphate | 15 | 15 | 10 | 10 |
| Antioxidant | 1 | 1 | 1 | 1 |
| α,α'-bis(t-butylperoxy)diisopropyl benzene crosslinking agent | — | 2 | — | 2 |
| PROPERTIES | | | | |
| Tensile strength, psi | 310 | 470 | 315 | 530 |

TABLE 1-continued

|  | 1 | 2 | 3 | 4 |
|---|---|---|---|---|
| Elongation, % | 85 | 200 | 70 | 240 |
| Vertical Burn Test, ⅛ inch specimen: | | | | |
| Drip characteristics | ND | ND | ND | ND |
| Seconds to quench | | | | |
| 1st ignition | >30, >30 | 10, 11 | >30, >30 | 14, 16 |
| 2nd ignition | — | >30, >30 | — | >30, >30 |

*precompounded by extrusion at 500–600° F.
ND = No drip.

EXAMPLES 5-8

Additional thermosetting compositions in accordance with the invention, and thermoplastic comparisons, were prepared with the ingredients listed below. Compositions 5 and 7 were compression molded at 360° F., for 45 minutes. Compositions 6 and 8 were compression molded at 360° F., for 10 minutes, to effect cure.

TABLE 2

|  | 5 | 6 | 7 | 8 |
|---|---|---|---|---|
| INGREDIENTS, parts by weight | | | | |
| Elastomeric styrene-ethylene/ butylene-styrene block copolymer | 30 | 30 | 40 | 40 |
| Poly(2,6-dimethyl-1,4-phenylene) ether resin | 45 | 45 | 30 | 30 |
| Elastomeric styrene-ethylene/ butylene-styrene block copolymer | 30 | 30 | 20 | 20 |
| Isopropylated triphenyl phosphate | 15 | 15 | 10 | 10 |
| Antioxidant | 1 | 1 | 1 | 1 |
| α,α'-bis(t-butylperoxy)diisopropyl benzene crosslinking agent | — | 2 | — | 2 |
| PROPERTIES | | | | |
| Tensile strength, psi | 345 | 620 | 360 | 650 |
| Elongation, % | 90 | 190 | 60 | 200 |
| Vertical Burn Test, ⅛" | | | | |
| Drip characteristics | ND | ND | ND | ND |
| Seconds to quench | | | | |
| 1st ignition | 9, 10 | 3, 5 | 12, 14 | 6, 8 |
| 2nd ignition | >30, 30 | 16, 20 | >30, 30 | 21, 24 |

*precompounded by extrusion at 500–600° F.
ND—No drip

All of the above mentioned patents and publications are incorporated herein by reference.

Other modifications and variations of the invention are possible and will occur to those skilled in the art in light of the above disclosure. It is to be understood, therefore, that changes may be made in the particular embodiments shown without departing from the spirit of the invention or its scope as defined in the appended claims.

The composition can be further modified, for instance, by including one or more additives often used with thermoplastic polymers, some of which may serve to beneficially affect the chemical and physical properties. Examples are mineral fillers, including clay, reinforcing agents, for example, glass fibers, flakes or spheres, plasticizers, stabilizers, antioxidants, colorants, processing aids, and so forth, in conventional amounts.

We claim:

1. An electrically conductive article, comprising a metallic conductor, at least a portion of the surface of which is covered with an electrically insulating layer of a heat or radiation curable flame retardant composition comprising an admixture of
   (a) a polyphenylene ether resin;
   (b) an alkenyl aromatic elastomer;
   (c) an amount of an aromatic phosphate flame retardant agent effective to improve the flame retardancy of (a) and (b); and
   (d) an amount of a crosslinking agent effective to cause crosslinking between (a) and (b).

2. An article according to claim 1, in which (a) is a homopolymer or copolymer having units of the formula

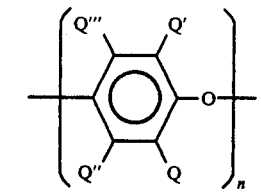

wherein Q, Q', Q" and Q"', are independently selected from the group consisting of hydrogen, halogen, hydrocarbon radicals, halohydrocarbon radicals, hydrocarbonoxy radicals, and halohydrocarbonoxy radicals; and n represents the total number of monomer units and is an integer at least about 20.

3. An article according to claim 1, in which (a) is poly(2,6-dimethyl-1,4-phenylene ether).

4. An article according to claim 1, in which (b) is a styrene copolymer or terpolymer.

5. An article according to claim 1, in which (b) is a styrene-ethylene/butylene-styrene terpolymer.

6. An article according to claim 1, in which (c) is an aromatic phosphate compound.

7. An article according to claim 6, in which the aromatic phosphate compound is triphenyl phosphate.

8. An article according to claim 7, in which the triphenyl phosphate is isopropylated.

9. An article according to claim 1, in which (c) is a bis diphenyl phosphate of resorcinol.

10. An article according to claim 1, in which (d) is an organic peroxide.

11. An article according to claim 10, in which (d) is $\alpha, \alpha'$-bis(tert-butyl peroxy) diisopropyl benzene.

12. An article according to claim 1, in which the flame retardant composition includes (e) a stable brominated flame retardant material in a flame retardancy enhancing amount.

13. An article according to claim 12, in which (e) is a brominated bisphenoxy alkane.

14. An article according to claim 13, in which (e) is 1,2-bis(2,4,6-tribromophenoxy) ethane.

15. An article according to claim 13, in which (e) is 1,2-bis(2,3,4,5,6-pentabromophenoxy) ethane.

16. An article according to claim 12, in which (e) is an oligomeric tetrabromobisphenol A polycarbonate.

17. An article according to claim 1, in which the flame retardant composition has been cured by exposure to high energy electrons.

18. An article according to claim 1, in which the flame retardant composition has been cured by exposure to heat.

19. In a method for preparing an electrically conductive article, the improvement comprising using as insulation material a heat or radiation curable flame retardant composition comprising an admixture of
   (a) a polyphenylene ether resin;
   (b) an alkenyl aromatic elastomer;
   (c) an amount of an aromatic phosphate flame retardant agent effective to improve the flame retardancy of (a) and (b); and
   (d) an amount of a crosslinking agent effective to cause crosslinking between (a) and (b).

20. A method according to claim 19, in which (a) is poly(2,6-dimethyl-1,4-phenylene ether).

21. A method according to claim 19, in which (b) is a styrene-butadiene rubber.

22. A method according to claim 19, in which (b) is a styrene-ethylene/butylene-styrene copolymer.

23. A method according to claim 19, in which (d) is an organic peroxide.

24. A method according to claim 23, in which (d) is $\alpha, \alpha'$-bis(tert-butyl peroxy) diisopropyl benzene.

25. A method according to claim 19, in which the flame retardant composition further includes (e) a stable brominated flame retardant material.

26. A method according to claim 25, in which (e) is a brominated bisphenoxy alkane.

27. A method according to claim 25, in which (e) is an oligomeric tetrabromobisphenol A polycarbonate.

28. A method according to claim 19, in which (c) is isopropylated triphenyl phosphate.

29. A method according to claim 19, in which the flame retardant composition has been cured by exposure to radiation.

30. A method according to claim 19, in which the flame retardant composition has been cured by exposure to heat.

31. An article according to claim 1, in which (c) is a di- or polyfunctional compound or polymer of the formula

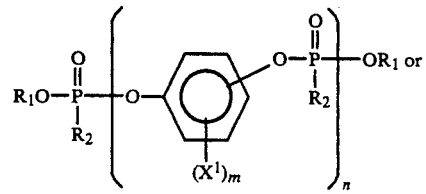

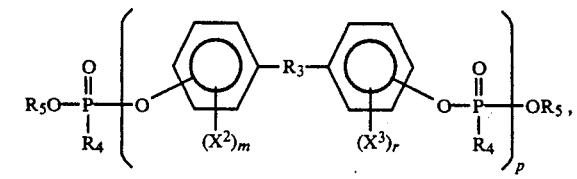

or

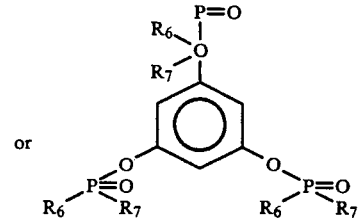

including mixtures thereof, in which $R_1$, $R_3$ and $R_5$ are, independently, hydrocarbon; $R_2$, $R_4$, $R_6$ and $R_7$ are, independently, hydrocarbon or hydrocarbonoxy; $X^1$, $X^2$ and $X^3$ are halogen; m and r are 0 or integers from 1 to 4, and n and p are integers from 1 to 30.

32. An article according to claim 1, in which (c) is a bis diphenyl phosphate or hydroquinone.

33. An article according to claim 1, in which (c) is a bis diphenyl phosphate of bisphenol A.

* * * * *